United States Patent
Mumford et al.

(10) Patent No.: US 10,371,065 B2
(45) Date of Patent: Aug. 6, 2019

(54) HIGH PRESSURE FLUID CONTROL SYSTEM AND METHOD OF CONTROLLING PRESSURE BIAS IN AN END USE DEVICE

(71) Applicant: WESTPORT POWER INC., Vancouver (CA)

(72) Inventors: David K. Mumford, Vancouver (CA); Derek Puzzuoli, Vancouver (CA); Jordan C. Haas, Courtenay (CA); Wesley A. Brown, Delta (CA); Victor Woo, Richmond (CA); Joshua W. Steffen, El Paso, IL (US)

(73) Assignee: WESTPORT POWER INC., Vancouver (CA)

( * ) Notice: Subject to any disclaimer, the term of this patent is extended or adjusted under 35 U.S.C. 154(b) by 0 days.

(21) Appl. No.: 15/735,871

(22) PCT Filed: Jun. 10, 2016

(86) PCT No.: PCT/CA2016/050667
§ 371 (c)(1),
(2) Date: Dec. 12, 2017

(87) PCT Pub. No.: WO2016/197252
PCT Pub. Date: Dec. 15, 2016

(65) Prior Publication Data
US 2018/0320605 A1 Nov. 8, 2018

Related U.S. Application Data

(60) Provisional application No. 62/175,157, filed on Jun. 12, 2015.

(51) Int. Cl.
*F02D 19/06* (2006.01)
*F02M 43/02* (2006.01)
(Continued)

(52) U.S. Cl.
CPC ..... *F02D 19/0605* (2013.01); *F02D 19/0628* (2013.01); *F02D 19/0642* (2013.01);
(Continued)

(58) Field of Classification Search
CPC . F02D 41/0025; F02D 41/0027; F02M 21/02; F02M 21/0218; F02M 2200/247; F02M 2200/315
See application file for complete search history.

(56) References Cited

U.S. PATENT DOCUMENTS

| | | | | |
|---|---|---|---|---|
| 3,016,886 A | * | 1/1962 | Benz | F02D 19/105 123/27 GE |
| 4,520,785 A | * | 6/1985 | Batchelor | F02M 21/04 123/27 GE |

(Continued)

FOREIGN PATENT DOCUMENTS

| | | |
|---|---|---|
| CA | 2 820 013 A1 | 9/2013 |
| CA | 2 868 338 A1 | 12/2014 |

OTHER PUBLICATIONS

European Search Report dated Dec. 4, 2018, for European Application No. 16806483.0, 9 pages.
(Continued)

*Primary Examiner* — Long T Tran
(74) *Attorney, Agent, or Firm* — Seed IP Law Group LLP (57) ABSTRACT

Disclosed are a fluid control system and method for controlling delivery of two variable pressure fluids to maintain a pressure bias between the two fluids within an end use device. The system employs an actively controlled vent valve which can be integrated into a fluid control module in preferred embodiments and is actuated to an open position to decrease fluid pressure in a first fluid supply line when a determined pressure differential reversal exceeds a predetermined threshold pressure differential reversal. The disclosed system is particularly useful in a high pressure direct
(Continued)

injection (HPDI) multi-fueled engine system where the first fluid is a gaseous fuel and the second fluid is a liquid fuel. The fluid control system and method of controlling it provide for improved control of venting along with protecting system components from high back pressure and cross contamination of fluids.

20 Claims, 6 Drawing Sheets

(51) Int. Cl.
    *F02M 43/00*     (2006.01)
    *F02D 41/00*     (2006.01)
    *G05D 16/20*     (2006.01)
    *F02M 43/04*     (2006.01)

(52) U.S. Cl.
    CPC ..... *F02D 19/0678* (2013.01); *F02D 41/0025* (2013.01); *F02D 41/0027* (2013.01); *F02M 43/00* (2013.01); *F02M 43/02* (2013.01); *F02M 43/04* (2013.01); *G05D 16/2026* (2013.01); *G05D 16/20* (2013.01); *Y02T 10/36* (2013.01)

(56) References Cited

U.S. PATENT DOCUMENTS

| | | | | |
|---|---|---|---|---|
| 5,379,740 | A | * | 1/1995 | Moore ............... F02D 19/0605 123/27 GE |
| 6,073,862 | A | | 6/2000 | Touchette et al. |
| 7,373,931 | B2 | | 5/2008 | Lennox et al. |
| 8,935,078 | B1 | | 1/2015 | Lorts |
| 2013/0333668 | A1 | * | 12/2013 | Coldren ................ F02M 37/04 123/456 |
| 2014/0238351 | A1 | * | 8/2014 | Haas ................... F02D 19/0605 123/446 |
| 2016/0003176 | A1 | * | 1/2016 | Marscheider ....... F02D 41/0027 123/445 |
| 2016/0177855 | A1 | * | 6/2016 | Kusakabe ............... F02D 41/20 123/490 |

OTHER PUBLICATIONS

International Search Report and Written Opinion of the International Searching Authority, dated Aug. 11, 2016, for International Application No. PCT/CA2016/050667, 7 pages.

* cited by examiner

Figure 1

(PRIOR ART)

HIGH PRESSURE FLUID CONTROL SYSTEM AND METHOD OF CONTROLLING PRESSURE BIAS IN AN END USE DEVICE

FIELD OF THE INVENTION

The present disclosure relates to a fluid control system for controlling delivery of variable pressure fluids to maintain a pressure bias in an end use device. More particularly, in an internal combustion engine system, the disclosed fluid control system controls the pressure of a gaseous first fuel with a pressure bias relative to the pressure of a liquid second fuel in a manner designed to reduce venting of the gaseous first fuel through an actively controlled gaseous vent valve.

BACKGROUND OF THE INVENTION

A desire for increased fuel economy and reduced emissions has led to directed efforts in developing high pressure fuel injection systems and associated alternative fuel supply systems. Cleaner burning fuels are increasingly being used to replace more conventional diesel fuel. Alternative gaseous fuel systems deliver, for example, natural gas, pure methane, butane, propane, biogas, hydrogen and blends thereof. However, more broadly than these examples, in this disclosure "gaseous fuel" is defined as any combustible fuel that is in the gaseous phase at atmospheric pressure and ambient temperature. Since gaseous fuels typically do not auto-ignite at temperatures as low as liquid fuels, such as diesel fuel, small amounts of liquid fuel can be introduced into the combustion chamber to auto-ignite and trigger the ignition of the gaseous fuel. However developing systems which employ two or more different fuels have some unique challenges, including finding the physical space for all the components of such a system which may include, by way of example, two or more fuel injection valves for each engine cylinder, two or more high pressure fuel rails, one or more drain rails for taking away fuel that is drained from the control chambers of the hydraulically actuated fuel injection valves, and two or more fuel supply systems for supplying the fuels to the engine. In order to address the space challenges, systems have been developed which utilize a single injector to deliver two fuels separately and independently of each other into an engine combustion chamber at pressures high enough to overcome the pressure within the combustion chamber upon injection as disclosed in U.S. Pat. No. 6,073,862 by Touchette et al. and U.S. Pat. No. 7,373,931 by Lennox et al., both of which are incorporated herein by reference.

One of the challenges with this approach is providing consistent and uniform fueling pressure of the two or more fuels to the engine system for reliable engine performance and emissions control. When one or more of the fuels is in gaseous rather than liquid form, the ability to control the supply pressure of the fuel to the engine system becomes more challenging and requires tighter fluid handling and control systems than needed with fuels delivered in liquid form. Another challenge is keeping the different fuels separate when delivering the two or more fuels to the engine system. Again, this is even more challenging when one or more of the fuels is in a gaseous rather than liquid form, such as when a gaseous main fuel is employed within the same injector as a liquid pilot fuel. Leakage of gaseous fuel into liquid fuel supply lines is undesirable for a number of reasons, including the fact that it can result in faulty injection and/or ignition problems in the engine as well as result in an increase in unburned hydrocarbon emissions.

Preventing the leakage of a gaseous fuel into the liquid fuel cavities and channels of an injector can be prevented by maintaining the gaseous fuel pressure at a predetermined lower pressure compared to the liquid pilot fuel pressure. This pressure differential is referred to as the bias pressure, and this bias can be maintained by a pressure regulator which uses the liquid pilot fuel pressure as a reference pressure. Alternatively, the engine system can be calibrated based on a required gaseous fuel pressure and then the liquid pilot fuel pressure can be controlled to maintain a higher pressure than the gaseous fuel pressure. In both alternatives, a pressure regulator is associated with at least one of the systems fluid supply to maintain a pressure bias between the two fluids to prevent leakage of a first fluid into a second fluid.

Figure 1:
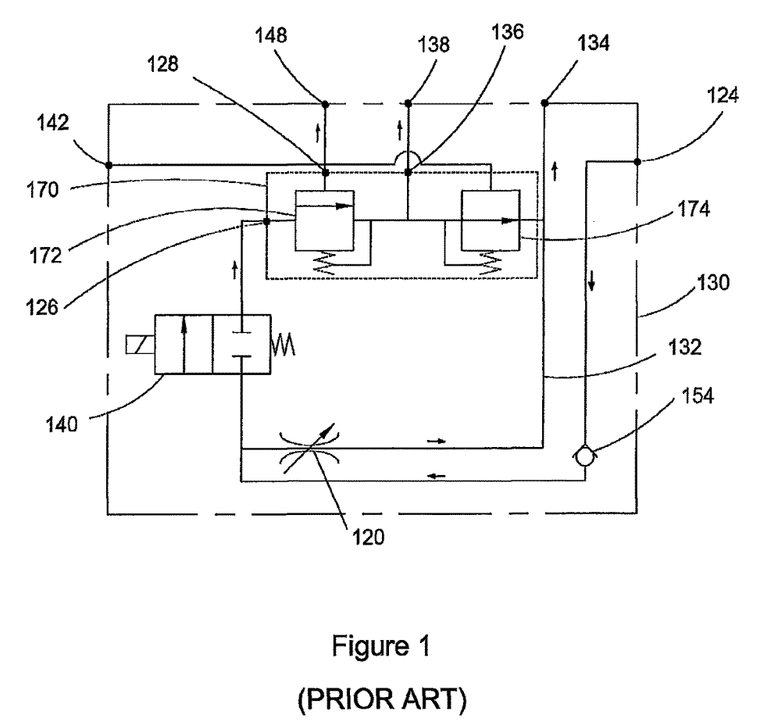
FIG. 1 illustrates a prior art schematic of a fluid control module which controls the pressure of a gaseous first fluid being directed to a gaseous fluid supply line (fuel rail) and then subsequently to one or more injectors using a passive self-relieving pressure regulator.

The two or more fluid supply systems also may have other components, for example, valves for preventing the backflow of one fluid to another fluid's supply lines and tank, valves for venting the pressure in fluid supply lines, and valves for shutting down the fluid supply when needed; all of which take up additional space. A fluid control module, as disclosed in Canadian Patent 2,820,013 by Mark et al., was developed for controlling two fluid pressures going to separate fuel rails for injection into an engine while simultaneously controlling the desired pressure bias between the two fluids to prevent leakage of one fluid into the other within one or more injector(s). This prior art system design, as shown in FIG. 1, employs a passive venting mechanism 174 within the fluid control module that vents gas the moment the gaseous fluid pressure (which is intended to be the lower pressure fuel) exceeds the liquid fluid pressure within manifold body 130 of the fluid control module in order to maintain the pressure bias and prevent fluid contamination within the one or more injector(s). This system is effective in maintaining a pressure bias but it is designed to provide an ample margin of safety to prevent gaseous fuel from leaking into the liquid fuel. Nevertheless, because the two fluids pressures can fluctuate dynamically between the fluid control module and the fuel injectors this approach can lead to unnecessary venting of gaseous fuel. That is, because the control of the pressure bias is within the fluid control module which is removed some distance from the fuel injectors, where the fluid pressures, and more importantly, the pressure bias between the two fluids needs to be maintained, namely across match-fits between moving parts inside the injector(s). Unnecessary venting results in fluid loss to the system, and if not recovered in some way, gaseous fuel is released into the atmosphere.

This can be better understood, by reviewing the prior art fluid control module, shown in FIG. 1, which has a first fluid supplied to manifold body 130 through first fluid manifold inlet 124 and is directed through check valve 154 and shut-off valve 140 to pressure regulator 170 through first fluid pressure regulator inlet 126. The second fluid, acting as a pressure reference fluid, is supplied to manifold body 130 through reference fluid manifold inlet 142 which is fluidly connected to pressure regulator 170 through second fluid pressure regulator inlet 128. Second fluid pressure regulator inlet 128 is also in fluid communication with reference fluid manifold outlet 148. Pressure regulator 170 is designed such that it delivers the first fluid at a predetermined pressure bias compared to the second reference fluid pressure through first fluid pressure regulator outlet 136 and then out from manifold body 130 at first fluid manifold outlet 138. The first fluid pressure can also be reduced in the system by opening service valve 120, which vents fluid from manifold vent outlet 134 via vent line 132.

Prior art pressure regulator 170 is a dome loaded self-venting regulator (DLSR) having a pressure regulator valve component 172 and a passive vent valve component 174. Pressure regulator 170 links the two fluid pressures and controls the pressure bias between the two fluids so that the first fluid pressure, which can be in liquid and/or gaseous form, is controlled by the second fluid pressure, which can also be in liquid and/or gaseous form. In the illustrated prior art example in FIG. 1 the gaseous fuel is the first fluid controlled by the liquid second fluid. When the second fluid pressure moves up or down, the first fluid pressure moves up or down with the second fluid pressure by employing a mechanically set bias.

Pressure regulator 170 is designed such that the first fluid vents through passive vent valve 174 whenever there is a drop in the second fluid pressure below that of the first fluid pressure. When this occurs, the first fluid is directed from passive vent valve 174 to vent through vent line 132. In systems where the second (reference) fluid rises and falls gradually in pressure over time or when there is a large pressure bias between the two fluids, the reference pressure rarely drops below that of the first fluid pressure and the passive vent valve remains closed most of the time. However in systems where either the second fluid pressure drops quickly, the first fluid pressure rises quickly, or there is a small pressure bias, it can be more frequent for the second fluid pressure to drop below that of the first fluid pressure, and when this happens, passive vent valve 174 responds automatically by opening and venting the first fluid to vent line 132 and manifold vent outlet 134 in order to quickly drop the first fluid pressure thereby returning the fluid pressures exiting manifold body 130 back to the preset pressure bias.

This passive venting of the first fluid from the fluid control module occurs any time the second fluid pressure is lower than the first fluid pressure, either due to a drop in the second fluid pressure at the pressure regulator or when there is an increase in the first fluid pressure downstream of the fluid control module. When the fluid control module is employed in a mobile multi-fueled engine system designed to operate in many different fueling modes and change between those modes smoothly and quickly, unnecessary venting of fluid from the prior art fluid control module can result, especially in systems where the first fluid is a gaseous main fuel and the second fluid is a liquid pilot fuel. One example of unnecessary venting of the prior art module can occur when the engine demand for fueling goes from a low fueling demand requiring low or no flow rate of a first fluid (main gaseous fuel) and a second fluid (liquid pilot fuel) to a high fueling demand mode. This can occur when moving from idle mode to high demand mode; for example, the initial tip in on the accelerator when starting up a hill can drop the second fluid rail pressure below that of the first fluid rail pressure leading to a passive vent. Another example of unnecessary venting of the prior art module can occur when oscillations within the injector cause the first fluid pressure to exceed that of the second fluid pressure at the fluid control module which also causes a passive venting of the first fluid.

Another problem with the prior art fluid control module configuration when it is employed in a mobile multi-fueled engine system is when the engine system is being run in a single fuel injection only mode. In this mode, injectors using one or more dynamic liquid fluid seals between separate fluid channels which normally act to keep the different fluids separate, will allow one fluid to flow through the injector into the other fluid rail and into the fluid control module potentially damaging the pressure regulator and contaminating the separate fluid supply lines. This can also result in venting of the second fluid, which can be a liquid fuel such as diesel, through the manifold vent outlet.

Accordingly, there is a need to provide an improved high pressure fluid control system and method for relieving fluid rail pressure while reducing unnecessary venting. Additionally there is a need to provide an improved fluid control module and method for relieving fluid rail pressure that isolates the pressure regulator from high rail back pressure.

SUMMARY OF THE INVENTION

A fluid control system, employing a fluid control module in preferred embodiments, and a method of controlling the delivery of two variable pressure fluids in order to maintain a pressure bias between the two fluids within an end use device, is disclosed herein. The fluid control system and method are particularly useful in high pressure direct injection (HPDI) multi-fueled engine systems. The fluid control system and method of controlling it provides for improved control of venting along with protecting system components from high back pressure damage, avoiding the problems encountered by prior art systems.

The system has a first fluid supply for supplying a first fluid to an end use device; a second fluid supply for supplying a second fluid to the same end use device; a sensor for measuring pressure in a first fluid supply line; a sensor for measuring pressure in a second fluid supply line; a pressure regulator for controlling a first fluid supply line pressure as a function of a second fluid supply line pressure; and an actively controllable vent valve in fluid communication with the first fluid supply line; wherein the actively controllable vent valve is actuatable to an open position from a closed position to decrease fluid pressure in the first fluid supply line when a determined pressure differential reversal exceeds a predetermined threshold pressure differential reversal. The determined pressure differential reversal can be a function of an amount and duration of a measured negative pressure differential. The predetermined threshold pressure differential reversal can be set as a function of at least one of an end use device fluid demand, an end use device operating mode, a first fluid temperature, a first fluid pressure, a second fluid temperature, and a second fluid pressure. The predetermined threshold pressure differential reversal can be determined from an output from an algorithm or a look up table stored in a memory of an electronic control unit.

In exemplary embodiments, the electronic control unit is connected to a solenoid for actuating the vent valve; as well as at least one first fluid supply line pressure sensor; and at least one second fluid supply line pressure sensor. The electronic control unit determines a first fluid pressure from the at least one first fluid supply line pressure sensor and a second fluid pressure from the at least one second fluid supply line pressure sensor and when the first fluid pressure is greater than the second fluid pressure, the electronic control unit can start a timer to determine a duration of a negative pressure differential occurrence. The electronic control unit can determine an accumulating pressure differential reversal and when the pressure differential reversal exceeds the predetermined threshold pressure differential reversal, the electronic control unit may actuate the actively controlled vent valve to an open position. The electronic control unit can be optionally connected to at least one of a first fluid pumping apparatus and a second fluid pumping apparatus, and when the electronic control unit determines the first fluid pressure is greater than the second fluid pressure and/or determines a pressure differential reversal with the pressure differential reversal being less than the predetermined threshold pressure differential reversal, the electronic control unit may command at least one of the pumping apparatus to raise the second fluid pressure and/or lower the first fluid pressure.

The pressure regulator in the system has a fluid regulator inlet in fluid communication with the first fluid supply for receiving the first fluid therefrom; a fluid regulator port in fluid communication with the second fluid supply for receiving the second fluid therefrom; and a regulator outlet for delivering the first fluid at a pressure below that of the second fluid pressure as a function of a predetermined pressure bias to the end use device. The actively controllable vent valve has a valve inlet fluidly connected to the regulator outlet, and a valve outlet in selective fluid communication with a vent outlet. The vent outlet can be in fluid communication with at least one of a first fluid return line of said first fluid supply and a second end use device.

In an exemplary embodiment the pressure regulator and actively controlled vent valve are integrated into a fluid control module having a manifold body to reduce the amount of piping, potential leak points, and the total volume of high pressure fluid in the fluid supply system. The manifold body also has a) manifold inlet for directing fluid into a first fluid passage of the manifold body for receiving the first fluid from first fluid supply and delivering the first fluid to a pressure regulator inlet; (b) a manifold port for receiving the second fluid from the second fluid supply and delivering the second fluid to a pressure regulator port; (c) a supply manifold outlet for delivering the first fluid from a second fluid passage connecting a pressure regulator outlet to the end use device; and (d) a vent manifold outlet for venting fluid from a third fluid passage which is in selective fluid communication with the actively controlled vent valve. Depending on the end use device, the fluid control module can optionally include additional components such as a second fluid isolation valve for selectively stopping fluid flow between the pressure regulator and the second fluid supply and a check valve for stopping fluid flow from an end use device back to a regulator outlet thereby protecting individual fluid passages and/or lines from cross contamination and back pressure during certain modes of operation; as well as optionally including a service valve, and pressure relief valve (PRV).

In exemplary embodiments, additional pressure differential reversal mitigation strategies can be employed when a negative pressure differential occurs. When the pressure differential reversal is above a predetermined threshold pressure differential reversal, in addition to or as an alternative to opening the actively controllable vent valve, commanding a second fluid pressure pumping apparatus to increase the second fluid pressure supply, and/or commanding a first fluid pumping apparatus to decrease the first fluid pressure supply may also be employed to return the first and second fluids to a predetermined pressure bias. When the pressure differential reversal is below a predetermined threshold pressure differential reversal, the actively controllable vent valve remains closed while a second fluid pressure pumping apparatus can be actuated to increase the second fluid pressure supply, and/or a first fluid pumping apparatus can be actuated to decrease the first fluid pressure supply to return the first and second fluids to a predetermined pressure bias. In addition or as an alternative, only the pressure regulator is employed to return the first and second fluids to a predetermined pressure bias when the controller determines the pressure differential reversal is small enough to not lead to cross contamination of fluids at the end use device. A method of controlling a fluid pressure bias between a first fluid and a second fluid within an end use device includes (a) regulating the pressure of one of the first fluid or the second fluid to maintain the fluid pressure bias at an upstream location that is removed from the end use device; (b) measuring pressure in a first fluid supply line between the upstream location and the end use device; (c) measuring pressure in a second fluid supply line; (d) determining a pressure differential reversal between the first fluid and the second fluid within the end use device as a function of at least measured pressures in the respective first and second fluid supply lines; and (e) when the determined pressure differential reversal exceeds a predetermined threshold pressure differential reversal, actively controlling a vent valve to open and thereby reduce the pressure within the end use device.

Additionally the method of controlling a fluid pressure bias between a first fluid and a second fluid within an end use device may optionally include f) actively controlling at least one of a second fluid pumping apparatus to raise the second fluid pressure and/or a first fluid pumping apparatus to lower the first fluid pressure when the first fluid pressure is greater than the second fluid pressure; and/or (g) at least one of lowering the first fluid pressure at a first fluid pumping apparatus and/or raising the second fluid pressure at a second fluid pumping apparatus when the determined pressure differential reversal is less than the predetermined threshold pressure differential reversal; and/or (h) at least one of lowering the first fluid pressure at a first fluid pumping apparatus and/or raising the second fluid pressure at a second fluid pumping apparatus when the determined pressure differential reversal is greater than the predetermined threshold pressure differential reversal.

Additionally, in some embodiments, a non-relieving pressure regulator can be employed having a weep orifice in the pressure regulator housing between two piston seals which allows any fluid leaking past a first seal to weep out of the pressure regulator housing instead of continuing to leak past a second seal to contaminate a separate fluid chamber. The weep orifice also can be attached to a drain line for diverting fluid that has leaked past a seal and out the weep orifice.

The term "and/or" is used herein to mean "one or the other or both". Additional features and advantages of the invention may be understood from other sections of this disclosure by reference to the drawings, and by practicing the disclosed method with the disclosed apparatus.

BRIEF DESCRIPTION OF THE DRAWINGS

The drawings illustrate specific preferred embodiments of the invention, but should not be considered as restricting the spirit or scope of the invention.

DETAILED DESCRIPTION OF PREFERRED EMBODIMENT(S)

The fluid control module for controlling a first fluid supply line pressure illustrated in the exemplary embodiments can be used in any end use device system where one fluid pressure needs to be controlled relative to another fluid pressure. For example, when an end use device is an internal combustion engine fuelled with two or more fuels, where two or more fuels are injected directly into the combustion chamber of the engine, the pressure of a first fuel can be controlled as a function of the pressure of a second fuel which is used as a reference for maintaining a pressure bias between the pressures of the two fluids.

Figure 2:
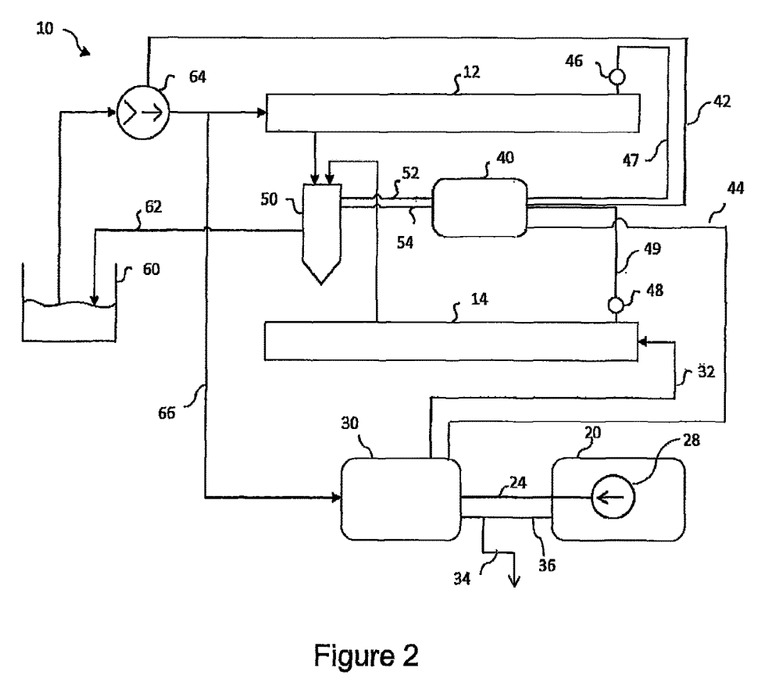
FIG. 2 is a schematic diagram of an exemplary multi-fuel system for a high pressure direct injection internal combustion engine showing the flow of a first and second fuel from fuel supply tanks from their upstream supply locations through a fluid control module for controlling the pressure of a first fluid supply line (for example a gaseous main fuel) pressure before being directed downstream to a common rail and on to one or more injector(s) mounted on an internal combustion engine.

The embodiments disclosed herein are described, by way of example, in relation to a gaseous fuelled internal combustion engine system as the end use device, illustrated in FIG. 2, which is fueled with a gaseous first fluid (first fuel) as the main fuel and a liquid second fluid (second fuel) as a pilot fuel, but the present disclosure will be understood to apply more generally, to other multi-fluid systems when it is important to maintain a pressure bias between the fluids to prevent one fluid from leaking into another fluid at the end use device.

FIG. 2 illustrates an exemplary end use system in the form of a multi-fuel engine system 10 for a high pressure direct injection internal combustion engine showing the flow of a first and second fuel from their respective fuel supply systems from their respective upstream supply locations through fluid control module 30 for controlling the pressure of a first fuel rail pressure before directing the first fluid downstream to a first fuel rail and then to one or more injector(s) mounted on an internal combustion engine. The term fuel rail is a term used in the art to refer to the fluid supply line which delivers the fuel to an engine system. Engine system 10 shows only one fuel injector, fuel injector body 50; however, as would be understood by those familiar with the technology, there can be one or more fuel injectors with fuel being distributed to more than one fuel injector through what is termed a common rail.

Referring to FIG. 2, a first fluid (first fuel) is pressurized by first fluid pumping apparatus 28 in first fluid supply system 20 to a pressure greater than required for delivery to injector body 50. The first fluid (first fuel) is delivered to fluid control module 30 through first fluid supply line 24 where its pressure is reduced to a pressure below a reference pressure for a second fluid (second fuel). The first fluid is then delivered to fuel injector body 50 through a main fluid supply line circuit comprising first fluid supply line 32 and first fluid common rail 14. Pressure sensor 48 sends signals representative of first fluid injection pressure in first fluid rail 14 to electronic control unit (ECU) 40 (also referred to herein as electronic controller and controller) through communication line 49.

A second fluid (second fuel), which can be employed as a pilot fuel to ignite a first fuel when the first fuel has a high octane number making it difficult to auto-ignite, is directed from second fluid supply tank 60. Examples of fluids that may be employed as a pilot (second) fuel are generally liquid fuels having a lower octane rating such as diesel, gasoline, dimethyl ether (DME), biodiesel, diesel fuel marine (DFM), and kerosene. The second fluid is pressurized by second fluid pumping apparatus 64 which is controlled by ECU 40 through pump communication line 42. The second fluid is then delivered to injector body 50 and fluid control module 30 through a second fluid supply line circuit comprising second fluid common rail 12 and second fluid line 66. Pressure sensor 46 sends signals representative of the second fluid's injection pressure in second fluid common rail 12 to ECU 40 through communication line 47. Second fluid pumping apparatus 64 can comprise a fuel control valve (not shown) and a common rail pump (not shown), as is known by those familiar with the technology.

Fuel injectors that introduce both a first and a second fuel into the combustion chambers of an engine system, such as fuel injector body 50, can employ the second fuel in one or more fluid seals for sealing the first fuel inside the injector body, for example when the second fuel is a liquid fuel like diesel and the first fuel is a gaseous fuel like natural gas. By way of examples and by no means limiting, additional fuels which can be employed as a first fuel are methane, propane, butane, biogas, hydrogen, ethane and mixtures thereof. The differential pressure between the second fluid (second fuel) and the first fluid (first fuel), referred to herein as the bias, is maintained within a range of tolerance for the one or more fluid seals separating a first fluid channel or cavity from a second fluid channel or cavity and for the injector valves in injector body 50 to function correctly.

Figure 3:
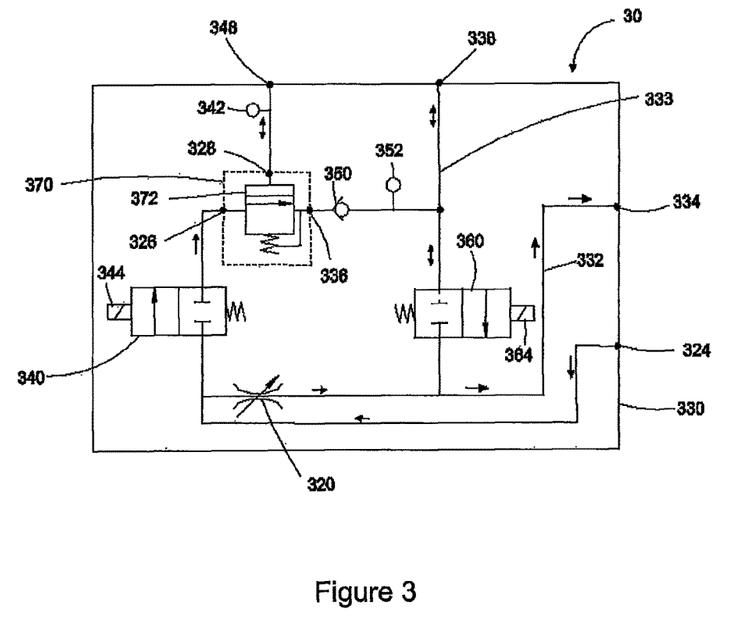
FIG. 3 is an exemplary embodiment of the invention illustrating a schematic of a fluid control module which controls the pressure of a first fluid being directed to a fluid supply line and then subsequently to an end use device, for example one or more injectors in a multi-fueled direct injection engine system, using a pressure regulator and a separate actively controlled vent valve.
Figure 4:
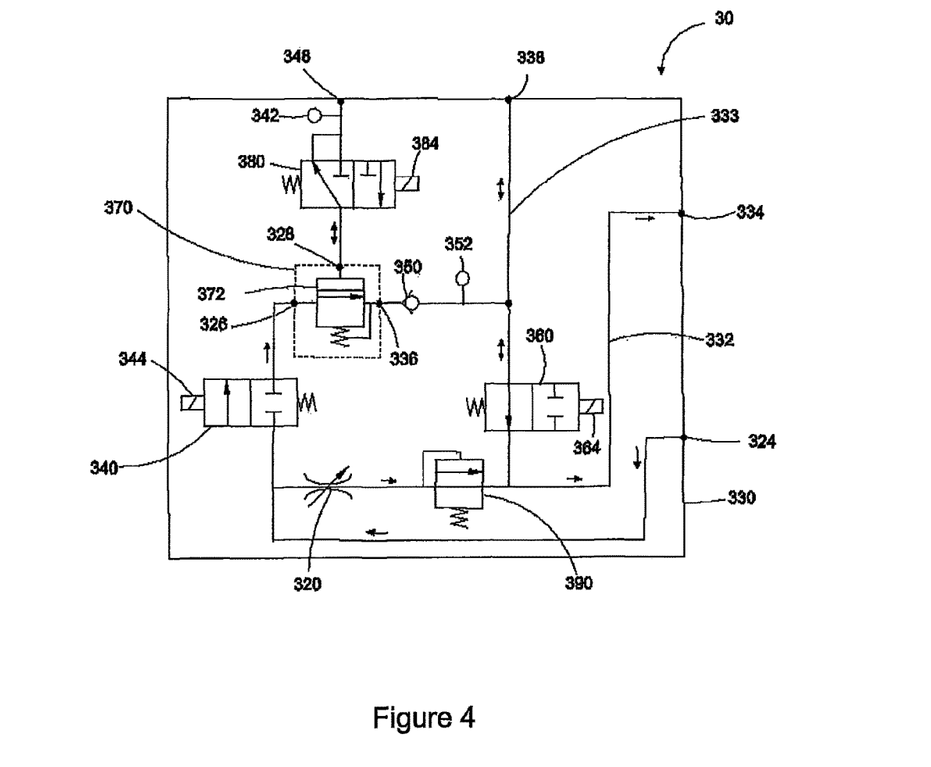
FIG. 4 is another exemplary embodiment of the invention illustrating a schematic of a fluid control module which controls the pressure of a first fluid being directed to a fluid supply line and then subsequently to an end use device, for example one or more injectors in a multi-fueled direct injection engine system, using a pressure regulator and a separate actively controlled vent valve.

The bias is regulated in fluid control module 30, exemplary embodiments of which are shown in greater detail in FIGS. 3 and 4. Fluid control module 30 regulates the bias using pressure regulator 370 and actively controlled vent valve 360, which is controlled by ECU 40 through communication line 44. Pressure regulator 370 (shown in FIGS. 3 and 4) uses the second fluid pressure in second fluid line 66 as a loading mechanism for regulating a first fluid pressure in first fluid supply line 32 to maintain a first fluid pressure below that of the second fluid pressure.

Communication lines 42, 44, 47, 49, 52 and 54 shown in FIG. 2 are representative of electrical connections between ECU 40 and the system components to which they connect. Communication line 44 between ECU 40 and fluid control module 30 is representative of wired or wireless communication between ECU 40 and individual fluid control module components which can include one or more electronically controlled valves as well as optional signal communications with temperature and pressure sensors which can be integrated into fluid control module 30 depending on the system requirements and spacing available. The electrical signals may be transmitted through wired lines or wirelessly through the use of radio wave or electromagnetic technologies and/or a secondary electronic control unit mounted on or near fluid control module 30 which in turn is connected to ECU 40. ECU 40 can also control second fluid pumping apparatus 64 through communication line 42; actuation of a first fuel injection valve through communication line 54 and a second fuel injection valve through communication line 52, with both of the first and second fuel injection valves being housed in shared injector body 50. As well, ECU 40 can receive signals representative of pressure, and in some embodiments additionally temperature, from optional sensors 46 and 48 for monitoring pressure and/or temperature of fluids in second fluid common rail 12 and first fluid common rail 14 respectively.

Referring to exemplary embodiments schematically shown in FIGS. 3 and 4, fluid control module 30 is illustrated showing fluid control manifold body 330 to which is mounted gas shut off valve 340, pressure regulator 370, service valve 320, check valve 350 and actively controlled vent valve 360 which are all fluidly connected to each other by means of fluid channels provided within manifold body 330. Besides actively controlled vent valve 360 being electronically actuated through solenoid 364, other valves can be electronically actuated by ECU 40 including first fluid shut off valve 340 through solenoid 344, and optional second fluid isolation valve 380 through solenoid 384 (shown in FIG. 4). FIGS. 3 and 4 show fluid lines representing the internal fluid channels of fluid control module 30 interconnected in manifold body 330. A first fluid which can be in gaseous form is supplied to fluid control module 30 through first fluid manifold inlet 324 and is directed through first fluid shut-off valve 340 to pressure regulator 370. Pressure regulator 370 receives the first fluid through a first fluid regulator inlet 326 and the second fluid through a second fluid regulator port 328 and delivers the first fluid at a predetermined pressure bias compared to a second fluid supply line pressure through first fluid regulator outlet 336. Pressure regulator 370 can be a dome loaded regulator (DLR) having pressure regulator valve 372. However, unlike prior art systems, it does not have a self-relieving vent valve (see passive vent valve component 174 in FIG. 1). Instead a separate, actively controlled vent valve 360 is fluidly connected to pressure regulator 370. Actively controlled vent valve 360 is actively controlled by actuation of solenoid 364 by ECU 40 by way of representative communication line 44 (shown in FIG. 2) to control the opening of vent valve 360 in response to a determination by ECU 40 that the first fluid pressure needs decreasing downstream of fluid control module 30 at first fluid common rail 14 and/or injector body 50. Pressure regulator 370 links the first fluid's pressure to the second fluid's pressure within fluid control module 30, using the second fluid pressure as the reference fluid pressure. The second fluid is supplied to fluid control module 30 through reference fluid manifold port 348 which is fluidly connected to pressure regulator 370 at second fluid regulator port 328. The second fluid can flow in and out of fluid control module 30 through the same orifice, shown in FIGS. 3 and 4, at second fluid manifold port 348. Alternately, the second fluid can be supplied to fluid control module 30 through an inlet separate from its outlet as shown in the prior art FIG. 1 schematic. Second fluid manifold port 348 shown in FIGS. 3 and 4 reduces the amount of fluid passages and/or piping and the number of possible leak paths.

Pressure regulator 370 controls the pressure bias between the two fluids so that the first fluid pressure is controlled by the second fluid pressure. In other words, when the second fluid pressure moves up or down, the first fluid pressure follows, moving up or down, with the second fluid pressure by employing a mechanically set bias. When there is a drop in the reference fluid pressure (second fluid pressure) below that of the first fluid pressure, pressure regulator valve 372 reduces the first fluid pressure over a period of time to bring the first fluid pressure back to a pressure below that of the second fluid pressure by the amount of the set bias. The first fluid continues to flow out fluid regulator outlet 336 to first fluid line 333 through check valve 350. Pressure regulator valve 372 is fluidly connected to actively controlled vent valve 360 and first fluid manifold outlet 338 through first fluid line 333 which directs the first fluid to a first fluid injector valve of injector body 50 by way of first fluid common rail 14. First fluid line 333 can be an internal passage in fluid control manifold body 330, an external passage, or a combination of both depending on the fluid control system and mounting arrangement of pressure valve 372 and actively controlled vent valve 360. Alternatively, components of fluid control module 30 do not all need to be integrated into manifold body 330. Instead, fluidly connecting the components shown in FIGS. 3 and 4 using lines operatively arranged as shown may be preferred for some systems where space considerations make employing a manifold body less desirable.

ECU 40 is an electronic control unit having data inputs (in the form of signal inputs), outputs (in the form of commands), a processor and memory; including permanent memory (such as FLASH or EEPROM) and temporary memory (such as SRAM or DRAM), for storing and executing one or more programs therein. Electronic controller 40 monitors system conditions through data inputs which can include but are not limited to the fluid supply line pressures, fluid (fuel) demand, fluid and engine temperatures and engine operating modes. When certain predetermined conditions are met, outputs in the form of one or more commands to one or more actively controlled system components is used to control the pressure in the system so that the pressure between the first and second fluids is controlled to maintain a set pressure bias between the two fluids within one or more injectors.

Whenever electronic controller 40 determines through pressure sensor inputs a negative pressure differential (−deltaP) occurrence in the system, which occurs when the measured first fluid pressure (P1) exceeds the second fluid pressure (P2), controller 40 compares the resulting Pressure Differential Reversal (PDR) to a set threshold PDR (PDRth). If the determined PDR is greater than a set threshold PDR, then the controller sends a command signal to solenoid 364 to open vent valve 360 to quickly reduce first fluid pressure in first fluid line 333 and subsequently in the end use device, such as in injector body 50. Whether the first fluid supply line pressure (P1) rises above that of the second fluid supply line pressure (P2) or the second fluid supply line pressure (P2) drops below that of the first fluid supply line pressure (P1), a negative pressure differential (−deltaP) results. If the resulting determined PDR is greater than a set threshold PDR, then electronic controller 40 sends a signal to solenoid 364 to open vent valve 360 to quickly reduce first fluid pressure in first fluid line 333 and subsequently in the end use device.

If the PDR based on the initial measured negative pressure differential is less than the set threshold PDR, in other words is too small to be seen at the end use device, ECU 40 does not actuate vent valve 360 to an open position. However if the occurrence of the negative pressure differential is not brief the resulting accumulating PDR may be seen at the end use device. ECU 40 therefore continues to determine an accumulating PDR as a function of time for however long the negative pressure differential occurs in the system and when the accumulating PDR (which can be either a real-time PDR or predictive PDR depending on the control system) exceeds than the set threshold PDR, ECU 40 sends a command signal to solenoid 364 to open vent valve 360 to quickly reduce first fluid pressure in first fluid line 333 which subsequently reduces the pressure in the end use device.

In systems such as the system embodiment shown in FIG. 2, where the controller can actively control components besides vent valve 360 to mitigate the PDR, the controller can command one or more other actively controlled system components to alleviate a negative pressure differential prior to the PDR exceeding the set threshold PDR. The additional PDR mitigation strategies can include electronic controller 40 commanding pumping apparatus 64 to increase the output pressure of the second fluid thereby raising the pressure of the second fluid downstream such that the two fluids are returned to the set pressure bias. In addition to or as an alternative to adjusting pressure at second fluid pumping apparatus 64, electronic controller 40 can command first fluid pumping apparatus 28 to lower the output pressure of the first fluid from pumping apparatus 28 thereby lowering the pressure of the first fluid downstream such that the two fluids are returned to the set pressure bias.

Depending on the system design, the actively controllable valves disclosed herein can be actuated from a closed to a fully open position or to a partially open position to control the flow of fluid there through. Also depending on the system design, the actively controllable valves can be designed to be in either an open or closed position when not in an energized state. For example, actively controlled vent valve 360 can be in a non-energized open position when the system is not in an energized state and may be the preferred position for systems not requiring a pressure to be maintained in the system when shutdown. In a system where it is desirable to have an actively controlled vent valve in the open position when the fluid system is not in use, ECU 40 sends a command signal to solenoid 364 to close vent valve 360 once the system becomes active. Vent valve 360 then remains in a closed position until the determined PDR is greater than a set threshold PDR and ECU 40 then sends a command signal to solenoid 364 to open vent valve 360.

Figure 6:
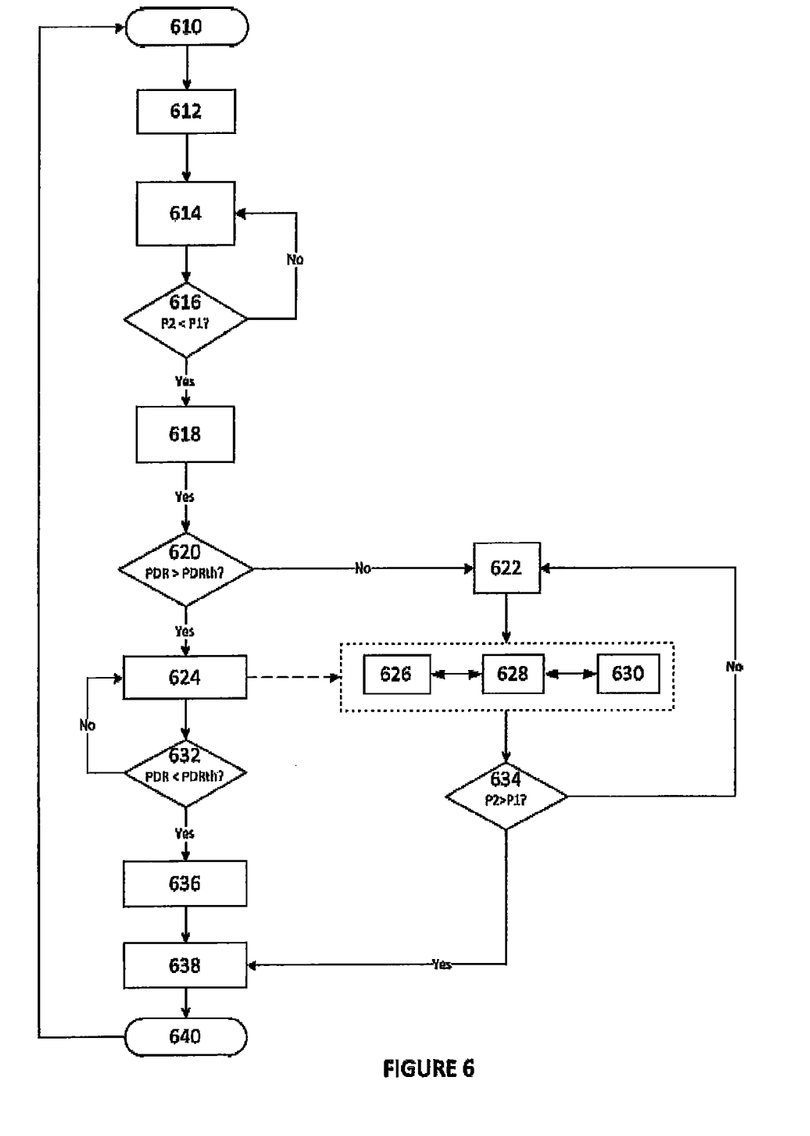
FIG. 6 is a flow chart depicting the steps of a method for controlling fluid system pressure in the fluid control system described herein.

The method of controlling the pressure bias at an end use device in a high pressure fluid control system as disclosed herein can be better understood by reference to the pressure control process schematic in FIG. 6. Starting at step 610, ECU 40 commands actively controllable vent valve 360 at step 612 to close or remain in a closed position. At Step 614, pressure of the first fluid is measured by one or more first fluid sensors (48, 352) and the representative signals are inputted to ECU 40 through respective communication lines (49, 44). Additionally, pressure of the second fluid is measured by one or more second fluid sensors (46, 342) and the representative signals are inputted to ECU 40 through respective communication lines (47, 44).

At step 616, the representative fluid pressures are compared and when a negative pressure differential occurs (P2<P1=−ΔP), ECU 40 starts a timer and determines the PDR at step 618. At step 620, if the determined PDR is greater than a set threshold PDR, ECU 40 sends a command signal to solenoid 364 to open vent valve 360 at step 624 to quickly reduce first fluid pressure in first fluid line 333 which subsequently reduces the pressure in the end use device. In addition to controlling the actuation of actively controlled vent valve 360, electronic controller 40 may adjust the first and second fuel pressures in the system by increasing and/or decreasing pressure through actuation of variable pressure pumps 28 and 64 respectively. Once ECU 40 determines the PDR is below PDRth at step 632, ECU 40 closes vent valve 360 at step 636 and resets the timer at step 638. The routine ends at step 640 and starts again at the beginning at step 610. Whenever fluid pressures are adjusted, ECU 40 can also adjust commands to the end user. For example, ECU 40 can adjust timing or duration of an injection event through communication lines 52 and 54 to ensure that the desired amount of fluid (fuel) is injected by injector body 50 in order to maintain combustion efficiency.

ECU 40 may determine, based on predetermined system parameters, no command signal needs to be sent to actuate actively controlled vent valve 360 when there is a PDR in the system. For example when a negative pressure differential occurs at the fluid control module, ECU 40 first determines at step 620 whether the reversal is severe enough to cause a negative pressure differential at the end use device (for example injector 50) and if the negative pressure differential is determined to not cause a reversal at the injector, then ECU 40 does not actuate vent valve 360 to an open position. Instead of actuating vent valve 360, electronic controller 40 can use other optional PDR mitigation strategies (at step 622) such as commanding second fluid pumping apparatus 64 (at step 626) to raise the output pressure of the second fluid from the pumping apparatus. Depending on the second fluid pumping apparatus, the second fluid pressure can be increased by, for example, adjusting a fuel control valve (not shown) at or in pumping apparatus 64. This raises the pressure of the second fluid downstream such that the two fluids are returned to the set pressure bias. In addition to or as an alternative to adjusting pressure at second fluid pumping apparatus 64, electronic controller 40 can command first fluid pumping apparatus 28 (at step 628) to lower the output pressure of the first fluid from pumping apparatus 28 thereby lowering the pressure of the first fluid downstream such that the two fluids are returned to the set pressure bias. In systems where one fluid is in a gaseous state and another fluid is in a liquid state, controlling the liquid fluid pressure is generally easier and results in greater precision of the controlled fluid pressures.

ECU 40 may also determine, based on predetermined system parameters, no command signal needs to be sent to actuate any actively controlled components in the system. For example, in a multi-fueled high pressure direct injection engine system as shown in FIG. 2 and described herein, fluid fuel rail oscillations occur which are seen at fluid control module 30 as a first fluid pressure spike; however as long as the pressure oscillations dissipate quickly enough and/or are low enough to not cause a negative pressure differential in injector body 50, then ECU 40 may determine no actively controlled components in the system need be actuated. Instead, regulator 370 returns the first and second fluid pressures to a set pressure bias, represented in FIG. 6 at step 630. Once ECU determines at step 634 that the second fluid pressure (P2) is higher than the first fluid pressure (P1), the timer is reset at step 638 and the routine is ended at 640.

Depending on system parameters such as the fluid rail pressures, fluid (fuel) demand, fluid and engine temperatures and engine operating mode, ECU 40 sets the threshold PDR (PDRth) which is used at step 620 to determine when the PDR is severe enough to cause a reversal at the end use device. This can be done either through processing representative system algorithms stored in ECU memory or through the use of look up tables stored in ECU memory.

Referring again to exemplary fluid control embodiments schematically shown in FIGS. 3 and 4, when ECU 40 determines the system parameters are such that vent valve 360 needs to be opened to reduce the first fluid supply line pressure in first fluid line 333 (and downstream of fluid control module 30) quicker than other system components (such as pressure regulator 370 and pumping apparatus 28 and 64) can react to reduce the first fluid supply line pressure and/or raise the second fluid supply line pressure; the controller sends a command signal to solenoid 364 to open vent valve 360 which then directs the first fluid through vent line 332 to vent manifold outlet 334. Vent line 332 can be an internal passage in fluid control manifold body 330, an external passage, or both depending on the fluid control system and mounting arrangement of actively controlled vent valve 360. Alternatively, when ECU 40 determines the system parameters are such that vent valve 360 can remain closed, the pressure of the first fluid is decreased more slowly, for instance, by pressure regulator valve 372 regulating the two fluid pressures to bring them back in line with the pressure bias. In some cases, the pressure of the first fluid may exit the fluid control module at manifold outlet 338 at a greater pressure than that of the second reference fluid creating a negative pressure differential as measured by pressure sensors in the system, such as sensors 342 and 352 shown in FIGS. 3 and 4. However the pressure bias can still be maintained with respect to the first and second fluid supply line pressures as measured closer to injector body 50 by for instance pressure sensors 46 and 48 (shown in FIG. 2). It is within the injector body that the pressure bias needs to be maintained to avoid the contamination of one fluid into the other fluid's injector cavities and channels.

There are a number of factors that determine the optimum pressure bias range in a fluid control system. The primary factors in a multi-fueled high pressure direct injection engine system such as the one disclosed herein are dependent on the operating pressures of the high pressure injection system (typically above 100 bar) and the individual injector nozzle and body design such as the match-fit and/or seals as well as injector actuation mechanisms and cavity and channel separation distances within the injector. For example, in the system shown in FIG. 2 and described herein, if the first fluid is a main fuel for supply to injector body 50 and is in gaseous form, and the second fluid is a pilot fuel in liquid form, when the gaseous first fluid pressure rises above that of the second fluid pressure, the gas will leak up a match-fit or around seals within the injector and become entrained in the liquid fluid cavities. The entrained gaseous fuel can then lead to erratic control of the injector as well as flow back to second fluid supply tank 60 through second fluid return line 62.

The bias is set by a number of factors including the flow properties of the second fluid which can for instance travel through a match-fit, separating a first fluid channel or cavity from a second fluid channel or cavity, thereby contaminating the first fluid cavity and/or channels. For injectors with a match-fit design between separate fluid cavities and/or channels, an air gap test can be used to determine the distance between the two surfaces of the match-fit, which is typically less than a 2-3 micrometer separation, but can vary depending on manufacturing tolerances and injector design. This data along with the length of the match-fit can be used to determine fluid flow timing from one fluid cavity and/or channel to the next for specific fluids at defined temperatures and pressures. The bias for the particular system can then be determined for the particular injector and fluids being supplied. ECU 40 can use either look up tables or an algorithm stored in memory to determine when vent valve 360 needs to be actuated to an open position to lower the pressure in first fluid rail 14 to drop the first fluid pressure below that of the second fluid pressure. ECU 40 uses the received signal data from pressure (and optionally temperature) sensors (46, 48, 342 and 352) to determine when a negative pressure differential occurs. The amount and duration of the negative pressure differential is then used by a program in ECU 40 memory to determine if the severity of the PDR is above a set threshold PDR, and when it is, actuate vent valve 360 to an open position to quickly lower pressure in the end use device such as injector body 50.

For fluid control systems which require a small pressure bias such as a 5-10 bar bias between the two fluids, ECU 40 needs to retain a tight control of fluid system components including actuation of vent valve 360, shut off valve 340, and variable pressure pumping apparatus 28 and 64 respectively in order to maintain the bias between the two fluids. As previously described, pressure (and optional temperature) sensors can be used to determine when ECU 40 needs to react to return the system to a desired pressure bias. For fluid control systems which allow for a higher bias such as a 50-75 bar bias, the ECU response time can be more relaxed allowing more time to balance the two fluid pressures in the system to maintain the desired bias.

For example, with a diesel pilot fuel as the second fluid and natural gas as the first fluid in a high pressure direct injection (HPDI) engine system, the first and second fuels need to be injected into the engine combustion chamber at a greater pressure than the engine cylinder pressure. Typically a pressure greater than 100 bar is desired in order to be at a higher pressure on injection than the pressure within the one or more engine combustion chambers. Therefore this requires the second fuel pressure to be maintained at a greater pressure than the minimum pressure for injecting the first fuel into the one or more engine cylinders plus the determined bias for the injection system. Therefore, if the minimum pressure for injecting a first fuel into the engine cylinder is determined to be 100 bar, the second fluid is delivered to fluid control module 30 at a fuel pressure greater than 105 bar for a system with a bias of 5 bar. Depending on the engine system and the determined bias required, the second fluid is delivered to fluid control module 30 at a fuel pressure typically greater than 105 bar. The second fluid pressure typically remains unchanged and the second (liquid) fuel is injected into an engine combustion chamber at a similar pressure to the pressure it comes into fluid control module 30. At the same time, the gaseous first fuel is directed into fluid control module 30 via first fluid manifold inlet 324 at pressures greater than the pressure needed for injection into an engine combustion chamber. The first fluid is directed to fluid control module 30 generally at a higher pressure than the second fluid reference pressure and depending on the predetermined bias, the gaseous first fluid pressure is decreased and is directed from fluid control module 30 at a pressure equivalent to the second fluid reference pressure less the bias. The bias is typically set from 5 to 75 bar, depending on the injection system and fluids being controlled.

Referring back to FIG. 2-4, when vent valve 360 is opened by ECU 40, or service valve 320 is opened during system servicing, the first fluid is directed out of fluid control module 30 through vent manifold outlet 334. The vented first fluid is then directed out of vent manifold outlet 334 to either be returned to first fluid supply system 20 by way of first fluid return line 36 or directed to a second end use device through line 34 such as a gas accumulator, an after treatment device, or vented to atmosphere depending on the multi-fuel system design and nature of the first fluid. By eliminating prior art passive vent valve 174 and controlling the actuation of vent valve 360 by ECU 40, venting of the first fluid from the fluid supply system can be greatly reduced and in some systems actuation of vent valve 360 may only occur at system shut down or when the fluid system is being serviced.

Managing the first and second fluid pressures in a multi-fuel engine system such as the one shown and described herein has advantages over prior art systems including the reduction of unnecessary venting of fluid from the system. However a potential problem could arise by the removal of prior art passive vent valve 174 (shown in FIG. 1) from the fluid control system due to potential gas rail back pressure from an event such as, but not limited to, an extended operation of supplying only a second fuel to injector body 50 of multi-fuel engine system 10 which could result in the over-pressurization of the first fluid section of pressure regulator 370. When multi-fuel engine system 10 is being operated in a mode that injects the second fluid alone, it becomes the main fuel and higher quantities of the second fuel are needed as opposed to when it is being used as a pilot fuel. First fluid shut off valve 340 can be closed (or remains closed) by ECU 40 actuating solenoid 344 which stops the supply of first fluid to first fluid common rail 14. ECU 40 can then signal actuation of second fluid injector valve inside injector body 50 through line 54 to inject only the second fluid at the same pressure used when the second fluid is a pilot fuel. Alternately, the second fluid can be delivered as the main fuel to one or more combustion chambers at a higher pressure than is used when the second fluid is a pilot fuel.

In a second fluid only fueling mode, the second fluid can migrate over to the first fluid cavities and channels within the injector and back down the first fluid common rail 14 and through line 32 to fluid control module 30. Unlike the actively controlled vent valve 360, the passive vent valve 174 would allow the second fluid to escape fluid control module 30 through the manifold vent outlet. In order to prevent possible damage from high rail backpressure to pressure regulator 370, check valve 350 can be included as part of fluid control module 30 to not only prevent high rail backpressure from reaching pressure regulator 370 but also from contaminating the first fuel supply system. This configuration could not be used with the prior art system since it would stop the flow of gas through the passive vent valve when required.

An alternate embodiment for fluid control module 30 is shown in FIG. 4. This alternate embodiment is similar to the embodiment shown in FIG. 3 and the numbers representing the same components have not been changed. However in this alternate embodiment, second fluid isolation valve 380 is in selective fluid communication between pressure regulator 370 and second fluid port 348. Second fluid isolation valve 380 is in an operatively open position during an engine fueling mode where the second fluid is needed as a reference pressure to control the first fluid supply pressure to injector body 50. Second fluid isolation valve 380 can be actuated to a closed position by ECU 40 when fluid control module 30 does not need the reference pressure of the second fluid to control the first fluid pressure. This would be advantageous, for example, when multi-fuel engine system 10 operates in a second fuel only injection mode and the pressure of the second fluid is increased to provide fuel at a higher pressure to one or more engine combustion chambers.

Additionally in an alternate embodiment shown in FIG. 4, pressure relief valve 390 can be optionally installed on first fluid vent line 332 in fluid communication between service valve 320 and vent manifold outlet 334. Pressure relief valve 390 is often used in engine fuel supply systems as a safety valve to relieve pressure in the line if the system pressure ever reaches an operational pressure limit for the specific system and system components.

In some embodiments, fluid control module 30 comprises fewer elements than illustrated in the present figures. For example, fluid control module 30 can comprise only pressure regulator 370, and actively controlled vent valve 360. First and second fluid supply line pressure and (optionally temperature) sensors can be mounted adjacent their respective fluid rails as shown in FIG. 2 as first fluid rail sensor 48 and second fluid rail sensor 46 instead of, or in addition to, pressure (and optionally temperature) sensors 342 and 352 mounted on fluid control module manifold body 330. Additionally, second fluid isolation valve 380 and check valve 350 protect individual fluid lines from cross contamination and back pressure during certain modes of operation but are not necessary for the primary operation of the fluid control module which is to control a pressure bias between the two fluids. However, a benefit of disclosed fluid control module 30 is that a manifold body integrates several components to provide an overall arrangement that is more compact, reducing the number of pipes between components and the number of associated connections and potential leak points. Fluid control module 30 preferably has a first fluid supply line pressure and/or temperature sensor 352 and a second fluid pressure and/or temperature sensor 342 which can be mounted on manifold body 330. Similarly, if there is sufficient space available on the engine, fluid control module 30 can be mated to a second fluid control module for the second fluid (not shown) to further reduce the amount of piping, the potential leak points, and the total volume of high pressure fluid in the fluid supply system. When there is not enough space to mount fluid control module 30 mated to a second fluid control module, the two fluid control modules can be mounted separately. While this is less preferred because it increases the amount of piping and the volume occupied by high pressure fluids, mounting fluid control module 30 and a second fluid control module separately can still provide benefits associated with higher volume manufacturing, component integration and using internal fluid passages within each fluid control module. For some fluid control systems, the space requirements are such that individual components are fluidly linked through external lines instead of combining components in a fluid control module. While this is less preferred due to the increased costs and problems associated with separately mounted components; the fluid control system will still function in the manner described herein and the method of controlling the variable pressure fluids is generally the same as with fluid control systems employing fluid control modules having integrated components. However in high pressure systems using variable pressure fluids, a fluid control module that integrates several components is preferred.

Figure 5:
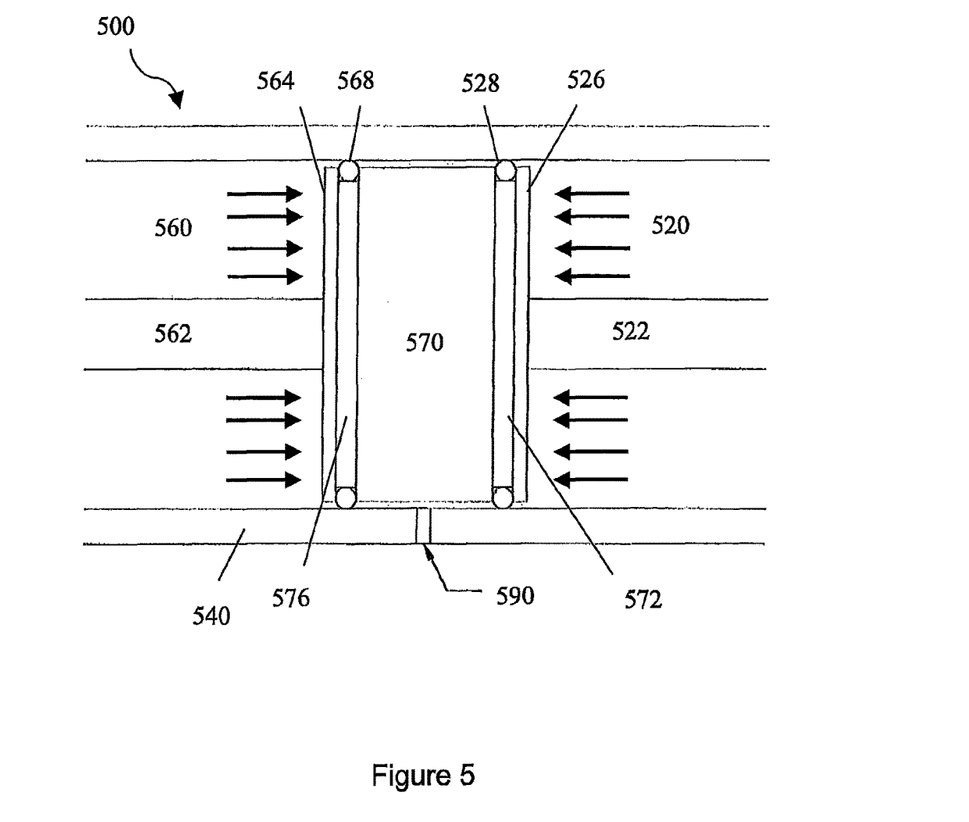
FIG. 5 is an exemplary schematic diagram of a dome loaded regulator which may be employed in the invention.

FIG. 5 illustrates an exemplary schematic diagram of a piston arrangement for a pressure reducing regulator, such as for example a dome loaded regulator, which may be employed in the invention as pressure regulator 370. Pressure regulator piston arrangement 500 has housing 540 and piston 570 separating a first fluid chamber 520 for receiving a pressurized first fluid from a second fluid chamber 560 for receiving a pressurized second fluid. Piston 570 has first fluid loading surface 526, second fluid loading surface 564 and piston rod 522 respectively. An optional rod 562 may also be applied to the fluid loading surface 564. Although not shown, piston rod 522 can be connected at its opposite end to a first fluid inlet (poppet) valve which when opened by pressure from piston rod 522 allows higher pressure first fluid to flow into first fluid chamber 520 thereby regulating the outlet pressure of the first fluid from the pressure regulator. Also, piston rod 562 can be connected at its opposite end to a biasing mechanism such as a spring that can be adjusted to set the first fluid outlet pressure desired as a function of the second fluid pressure and the set bias. Because the pressure regulator does not have a self-relieving vent valve component, it has been designed with weep orifice 590 which will allow any fluid from first fluid chamber 520, leaking past seal 528 which can be an O-ring seal positioned in piston groove 572, to weep out of the pressure regulator housing 540 instead of contaminating second fluid chamber 560. Likewise, any second fluid from second fluid chamber 560 that may leak past seal 568, which can be an O-ring seal positioned in piston groove 576, will weep out of weep port 590 instead of contaminating first fluid chamber 520. For example, if a second fluid is being used as a reference pressure fluid and fills second fluid chamber 560 pressing on second fluid loading surface 564 at a pressure of 400 bar and a first fluid fills first fluid chamber 520 pressing on first fluid loading surface 526 at a pressure of 350 bar, for a set pressure bias less than 50 bar, piston 570 will move towards first fluid chamber 520 and piston rod 522 then opens a first fluid inlet valve to allow higher pressure first fluid into first fluid chamber 520 until the two fluid pressures equilibrate with respect to the set pressure bias. If the bias is set at 50 bar for a second fluid reference pressure of 400 bar, then the two fluid pressures are at equilibrium when the first fluid pressure is at 350 bar and the second fluid pressure is at 400 bar in their respective pressure regulator chambers (520 and 560). With the two seal design, if the second fluid leaks past gasket seal 568, it will drain through weep orifice 590 instead of leaking past gasket seal 528 and contaminating first fluid chamber 520. Weep orifice 590 may be attached to a drain line for diverting any excess fluid that has leaked past the gasket seals 528 and/or 568 and out weep orifice 590.

While particular elements, embodiments and applications of the present invention have been shown and described, it will be understood, that the invention is not limited thereto since modifications can be made by those skilled in the art without departing from the scope of the present disclosure, particularly in light of the foregoing teachings. All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply. Additionally, the recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

We claim:
1. A system for controlling delivery of two variable pressure fluids to maintain a pressure bias between the two fluids within an end use device, the system comprising:
    a. a first fluid supply for supplying a first fluid to the end use device;
    b. a second fluid supply for supplying a second fluid to the end use device;
    c. a pressure regulator disposed in a first fluid supply line between the first fluid supply and the end use device for controlling a first fluid pressure within the end use device as a function of a second fluid pressure within the end use device;
    d. an actively controllable vent valve in fluid communication with the first fluid supply line between the pressure regulator and the end use device;
    e. a first sensor disposed between the pressure regulator and the end use device for measuring pressure in the first fluid supply line; and
    f. a second sensor for measuring pressure in a second fluid supply line;
    wherein said actively controllable vent valve is actuatable to an open position to decrease the first fluid pressure within the end use device when a determined pressure differential reversal exceeds a predetermined threshold pressure differential reversal.
2. The system of claim 1 wherein said determined pressure differential reversal is a function of an amount and duration of a measured negative pressure differential.
3. The system of claim 1 wherein said predetermined threshold pressure differential reversal is set as a function of at least one of an end use device fluid demand, an end use device operating mode, a first fluid temperature, a first fluid pressure, a second fluid temperature, or a second fluid pressure.
4. The system of claim 1 wherein at least one of the first fluid or the second fluid is in gaseous form at atmospheric pressure and ambient temperature.
5. The system of claim 1 wherein the pressure bias between the first fluid pressure and the second fluid pressure is in a range of 5 to 75 bar.
6. The system of claim 1 wherein the first fluid is supplied to the end use device at a pressure of at least 100 bar.
7. The system of claim 1 further comprising a check valve for stopping fluid flow from an end use device back to a regulator outlet for delivering said first fluid to the end use device.
8. The system of claim 1 further comprising a fluid control module having a manifold body on which at least said pressure regulator and said actively controlled vent valve are mounted to form a unitary and independent structure; said manifold body also having
    a. a manifold inlet for directing fluid into a first fluid passage of said manifold body for receiving said first fluid from the first fluid supply and delivering said first fluid to a pressure regulator inlet;
    b. a manifold port for receiving said second fluid from said second fluid supply and delivering said second fluid to a pressure regulator port;
    c. a supply manifold outlet for delivering said first fluid from a second fluid passage connecting a pressure regulator outlet to said end use device; and
    d. a vent manifold outlet for venting fluid from a third fluid passage which is in selective fluid communication with said actively controlled vent valve.
9. The system of claim 1 wherein the pressure regulator has a weep orifice in a pressure regulator housing between two piston seals for allowing any fluid leaking past a first seal to weep out of the pressure regulator housing.

10. The system of claim 9 wherein the weep orifice is attached to a drain line for diverting fluid that has leaked past one of said seals and out the weep orifice.

11. The system of claim 1 wherein an electronic control unit is connected to
   a. a solenoid for actuating said vent valve;
   b. at least one first fluid supply line pressure sensor; and
   c. at least one second fluid supply line pressure sensor;
   wherein said electronic control unit determines a first fluid pressure from said at least one first fluid supply line pressure sensor and a second fluid pressure from said at least one second fluid supply line pressure sensor and when said first fluid pressure is greater than said second fluid pressure, the electronic control unit starts a timer to determine a duration of a negative pressure differential occurrence.

12. The system of claim 11 wherein the electronic control unit is further connected to at least one of a first fluid pumping apparatus or a second fluid pumping apparatus, and when said electronic control unit determines said first fluid pressure is greater than said second fluid pressure, the electronic control unit commands at least one of said pumping apparatus to raise the second fluid pressure and/or lower the first fluid pressure.

13. The system of claim 1 wherein the end use device is at least one injector body for injecting said first and second fluids directly into a combustion chamber of an internal combustion engine.

14. A method of controlling a fluid pressure bias between a first fluid and a second fluid within an end use device, the method comprising:
   a. regulating the pressure of one of the first fluid or the second fluid to maintain the fluid pressure bias at an upstream location that is removed from the end use device;
   b. measuring pressure in a first fluid supply line between the upstream location and the end use device;
   c. measuring pressure in a second fluid supply line;
   d. determining a pressure differential reversal between the first fluid and the second fluid within the end use device as a function of at least measured pressures in the respective first and second fluid supply lines; and
   e. when the determined pressure differential reversal exceeds a predetermined threshold pressure differential reversal, actively controlling a vent valve to open and thereby reduce the pressure within the end use device.

15. The method of claim 14, further comprising actively controlling at least one of a second fluid pumping apparatus to raise the second fluid pressure and/or a first fluid pumping apparatus to lower the first fluid pressure when said first fluid pressure is greater than said second fluid pressure.

16. The method of claim 14 further comprising at least one of lowering the first fluid pressure at a first fluid pumping apparatus and/or raising the second fluid pressure at a second fluid pumping apparatus when said determined pressure differential reversal is greater than the predetermined threshold pressure differential reversal.

17. The method of claim 14 wherein said predetermined threshold pressure differential reversal is set as a function of at least one of an end use device fluid demand, an end use device operating mode, a first fluid temperature, a first fluid pressure, a second fluid temperature, or a second fluid pressure.

18. The method claim 14 wherein at least one of the first fluid or the second fluid is in gaseous form at atmospheric pressure and ambient temperature.

19. The method of claim 14 wherein said actively controlled vent valve vents fluid from said first fluid supply line through a vent line in fluid communication with at least one of a first fluid return line of said first fluid supply and/or a second end use device.

20. The method of claim 14 wherein the end use device is at least one injector body for injecting said first and second fluids directly into a combustion chamber of an internal combustion engine.

* * * * *